Jan. 10, 1967  C. J. HOOGENDOORN ET AL  3,296,774
GAS-LIQUID CONTACTOR WITH WALL OBSTRUCTIONS
AND CONTACTING METHOD
Filed Aug. 30, 1963  2 Sheets-Sheet 1

INVENTORS
CAROLUS J. HOOGENDOORN
WILLEM H. MANGER
BY Oswald H. Milmore
THEIR ATTORNEY

United States Patent Office 3,296,774
Patented Jan. 10, 1967

3,296,774
GAS-LIQUID CONTACTOR WITH WALL OB-
STRUCTIONS AND CONTACTING METHOD
Carolus J. Hoogendoorn and Willem H. Manger, Amsterdam, Netherlands, assignors to Shell Oil Company, New York, N.Y., a corporation of Delaware
Filed Aug. 30, 1963, Ser. No. 305,772
Claims priority, application Netherlands, Sept. 5, 1962, 282,917
7 Claims. (Cl. 55—92)

This invention relates to apparatus and method for contacting liquids and gases, comprising a contacting chamber enclosed by a tubular wall through which the gas and liquid move concurrently in an upward or downward direction, the said chamber having gas and liquid inlets at one end and gas and liquid outlets at the other. Several contacting units of such construction can be combined, e.g., arranged in parallel or may be arranged in series to effect over-all countercurrent flow between the liquid and gas.

The term "gas" is herein used generically to include vapor.

Apparatus of the general type indicated above is known from the United States Patent No. 2,808,897, issued October 8, 1957. In each unit of that apparatus the gas is passed upwards through a cylindrical chamber in the same direction as the liquid. At the inlet or lower end of the cylinder there is a vane deck which causes the gas to assume a rotary motion while ascending through the cylinder. Liquid is supplied to the gas stream at about the level of the vane deck, e.g., through one or more inlet openings in the vanes or a central inlet opening in the vane deck. By the resulting generally helical motion of the gas the liquid is entrained in the form of small droplets—which can be made smaller by using atomizer means at the said inlet opening(s) and connecting the atomizer means to a liquid supply duct. Thereby a large surface of the liquid is exposed to the gas, which is very desirable for promoting the mass transfer between the gaseous and liquid phases. After contact, at the top of the cylinder, the two phases are separated, and particularly in the application of this type of contacting to fractional distillation, it is of great importance that this separation occur at as short a distance after effective contact and mass transfer as possible.

According to the aforesaid United States patent, the separation of the liquid droplets from the gas is effected by the same rotary motion of the gas as that by which the droplets were produced. This motion flings the liquid droplets to the wall of the cylindrical chamber, and the layer of liquid thus formed on the wall flows outward through holes or slits in the said wall to a collecting chamber; the gas escapes through the upper, open end of the cylinder. According to the said patent, the separation of liquid droplets from the gas can be improved by installing a second vane deck just before the end of the cylinder, with a view to boosting the rotary motion of the gas, which decreases as a result of friction.

According to the said patent, the droplets, therefore, originate within the rotating gas stream, so that at that moment the mass transfer begins. At the same moment, however, also inertial forces become active and the gas-liquid separation become effective, so that the liquid droplets are coalesced and their surface area reduced; hence the efficiency of the overall mass transfer is limited. Application of second vane deck to improve the separation efficiency does not of itself destroy the inertial separating forces of the first deck while, moreover, there follows the unattractive result of a greatly increased pressure drop per unit due to the flow of the gas therein through two vane decks.

It is the object of the invention to improve the mass transfer between liquid and gaseous phases in apparatus of the character previously indicated without introducing or significantly introducing added pressure drop.

More specifically, it is an object to improve the mass transfer by utilizing the principle of re-entrainment of separated liquid between the initial point of liquid-gas engagement and the point of final separation, whereby liquid does not for any significant distance travel along the wall of the contacting chamber as a film but is brought again into the form of small droplets.

In summary, the foregoing objects are attained by providing the chamber wall over most and, preferably, all of the section of its length wherein mass transfer is to occur, with special elements which create turbulence and cause liquid which has collected on the wall to be re-entrained. Beyond the said section there is located a device for separating the liquid droplets from the gas, which is usually, although not necessarily, of the inertial type.

In summary, the contactor according to the invention comprises a tubular wall, e.g., a vertical cylinder, having means at the supply end, e.g., the bottom, for admitting a stream of gas and introducing the liquid thereinto, inertial means for separating the entrained liquid from the gas stream and separately discharging the separated gas and liquid at the other end, and, intermediate said supply end and the separator, projections on the inside of the tubular wall which are arranged to facilitate the entrainment and re-entrainment of the liquid in the gas stream.

The said tubular wall may have a constant, circular cross section, but the invention is not limited to either of these features. Thus, a polygonal cross section may be used, and the cross sectional area and/or outline may be variable at different levels.

The projections may be flat strips that extend from the tubular wall for suitable distances, preferably between 1 and 20% of the smallest diameter of the contacting chamber enclosed by the tubular wall. According to a preferred embodiment these strips are arranged as a grid, to form an annular structure having the appearance of an egg crate when viewed radially. For constructional reasons it is advantageous to place the strips perpendicular to the wall. The choice of radial extent of the projections will depend upon the thickness of liquid film of layer which collects on the column wall, a greater radial dimension being used as the layer is thicker.

The gas stream is normally admitted axially into the supply end of the contacting chamber refined by the tubular wall and the liquid is fed into this stream at the same end in any suitable manner to effect entrainment by the gas. It is not necessary to use atomizers for producing small droplets due to the action of the aforesaid projections, although the invention is not restricted to the avoidance of atomizers. For example, the liquid can be supplied to the tubular wall through one or a series of holes spaced equally about the circumference at the supply end swept off or along said wall by the gas stream. The part of the liquid swept along the wall is entrained as droplets by the action of the projections. Uniform spacing of a plurality of such holes is desirable for promoting uniform circumferential distribution of the liquid. The liquid can, further, be introduced instead through a slit or wall mounted on the tubular wall, or even through one or more inlet nozzles situated in the central part of the chamber at the supply end; the part of the liquid that strikes the tubular wall is carried along the wall as a film and is entrained by the gas by means of the projections.

The effect of the projections is to create local turbulence and to cause liquid on the tubular chamber wall—both that which is swept along the wall from the point of supply as well as that which is deposited thereon by droplets striking the wall—to be entrained in the gas stream as small droplets. Thereby the presence of small droplets throughout the mass transfer section of the contacting is assured and mass transfer is improved.

It was found that surprisingly favorable separate discharges of the gas and liquid, after inertial separation, can be effected by flowing the rotating gas into a collar or tube which extends toward the tubular wall from the inner edge of an annular wall and is spaced from the tubular wall in a way to leave the rim thereof exposed, the said collar being coaxial with the tubular wall and having a cross sectional outline which is similar to and an area which is less than that of the tubular wall. The liquid then overflows the said exposed rim and/or flows outside the said collar into a collecting sump.

The invention will be further described with reference to the accompanying drawing forming a part of the specification and showing certain preferred embodiments, wherein.

Figure 2:
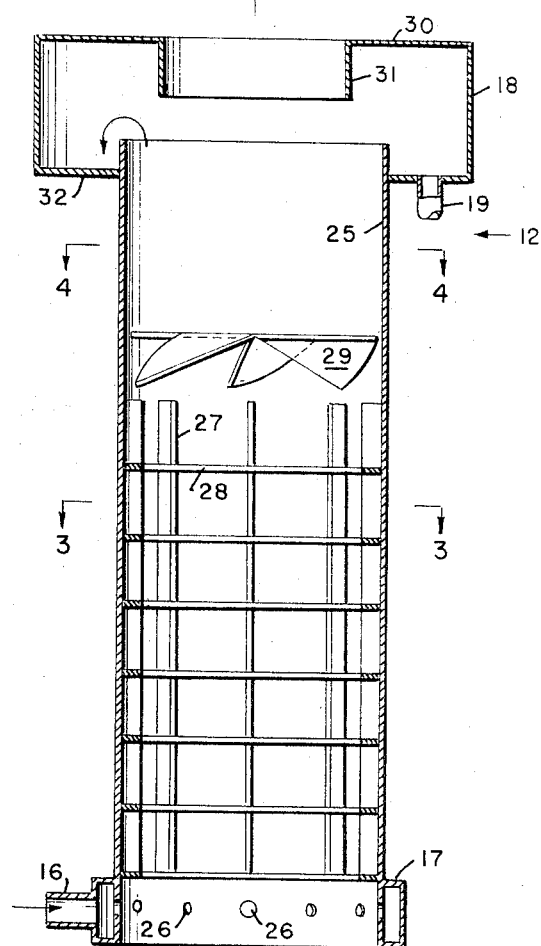
FIGURE 2 is a vertical cross sectional view through one of the contacting units.
Figure 3:
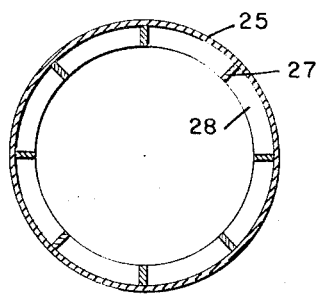
Figure 6:
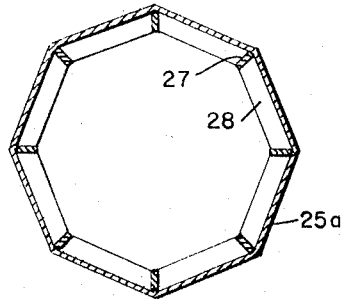
Figure 4:
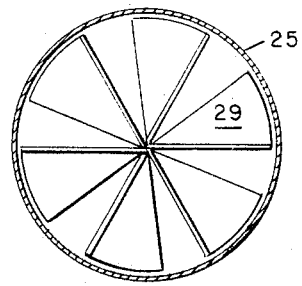
Figure 5:
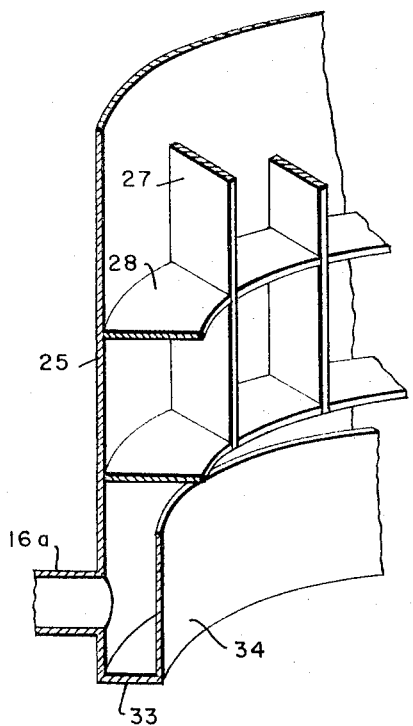

FIGURES 3 and 4 are sectional views taken, respectively, on the lines 3—3 and 4—4 of FIGURE 2;

FIGURE 5 is an isometric view of a part of a unit, showing a modified liquid supply arrangement; and FIGURE 6 corresponds to FIGURE 3 and shows a modification.

Figure 1:
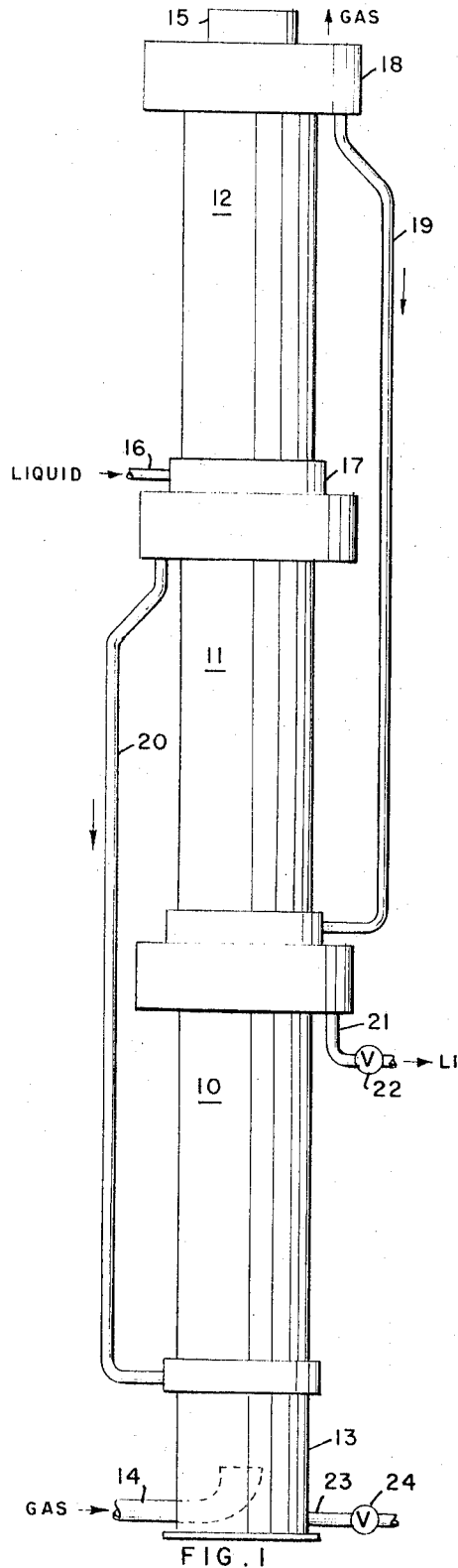
FIGURE 1 is an elevation view of a multi-stage countercurrent contactor comprising a series of superposed units which are constructed according to the invention.

Referring to FIGURE 1, there are shown three identical contacting units 10, 11 and 12, supported on a gas inlet column 13 to which the gas is admitted via a duct 14. The gas ascends through the several units and is, after repeated contact with liquid, discharged via a duct 15. The liquid to be contacted is fed to the bottom or supply end of the contacting unit 12 through a supply conduit 16 and an annular distribution chamber 17, carried upward through the unit 12 in contact with the gas, and separated from the gas in a separator 18. It is transferred by a conduit 19 to the supply end of the next unit 11. After entrainment by gas from the contacting unit 10 and upflow through the unit 11 and separation from the gas it is transferred by a conduit 20 to the supply end of the lower-most unit 10 for entrainment by the raw gas. After upflow through the last-mentioned unit and separation from the gas it is discharged through a conduit 21 and valve 22. An outlet 23 and valve 24 may be provided for draining the column 13.

It is evident that there is overall countercurrent flow but concurrent flow within each unit. The arrangement just described shows but one possible application of the contacting units. For example, a different liquid can be used in each or in several contacting units, and valves and/or pumps may be provided, as shown in the aforementioned United States patent.

Referring to FIGURES 2, 3 and 4, each contacting unit 12 comprises a tubular wall 25, here represented as a circular cylinder, which defines a contacting chamber and has open lower and upper supply and discharge ends. The lower end has a plurality of liquid supply holes 26 spaced at equal circumferential intervals and communicating with the chamber 17 which surrounds the wall and to which the liquid is supplied. Immediately above the holes 26 are flat vertical and horizontal strips 27 and 28, e.g., arranged as a grid and extending perpendicularly inward from the wall 25. These are herein called projections and extend preferably throughout substantially all of the contacting or mass-transfer section of the unit. Above this section is mounted a vane deck 29 consisting of a plurality of sector-shaped vanes inclined to impart a rotational movement to ascending gas. This deck is preferably located somewhat below the top of the wall 25 to provide a separating section.

The separator 18 includes an upper annular wall 30 mounted above the wall 25 and having a collar or stub-pipe 31 extending downwardly at the inner edge thereof and situated coaxially with the tubular wall 25. The collar 31 encloses a space the cross sectional area of which is similar in shape to but smaller than the cross sectional area of the chamber in the wall 25. Hence, when one is polygonal, both should be. When stacking contacting units as previously described each unit except the lowermost rests on the plate 30 of the next lower unit and is supplied with a stream of gas which ascends through the collar 31 of such lower unit. The separator further provides a sump, having a floor 32, for the collection of liquid.

Although it will be simpler to use a wall 25 which is cylindrical, it is not essential that the cross sectional areas or outlines be the same below and above the vane deck.

In operation, liquid admitted from the distribution chamber 17 through the holes 26 directly to the wall 25 is carried along that wall by the gas stream, which ascends from any source, such as the next lower unit. Within the mass-transfer section this liquid encounters the projections 27, 28, and liquid droplets are formed by gas entrainment. Droplet formation occurs throughout the said section, and any liquid which coalesces on the projections or the wall 25 is re-entrained in the gas. This sweeping and dispersal action depends upon the gas velocity. It was found that, for example, when working with hydrocarbons having a vapor density of 4 kg. per cu. meter, that a gas velocity of 3 meters per second is sufficiently high to produce the above-described action. The length of the said mass-transfer section may vary within wide limits, for instance, from 0.5 to 5.0 times the smallest diameter of the contacting chamber.

Above the mass-transfer section the gas flows through the vane deck 29 and is given a rotary motion about the central axis of the contacting chamber. This sets up centrifugal forces whereby the dispersed liquid droplets are flung outwardly to the wall 25, while being swept upward by the gas. The gas, largely denuded of liquid, escapes through the collar 31 while the liquid moves outwardly over the rim of the tubular wall 25. Some of this liquid strikes the walls 30 and 18 and falls onto the floor 32. To afford space for the centrifugal separation of the liquid, the wall 25 should extend above the vane deck for some distance, for instance, from 0.5 to 1.0 times the smallest diameter of the contacting chamber, although greater heights are feasible.

Excellent separation between gas and liquid is achieved. It has been found that with an apparatus of this type the quantity of liquid carried off with the gas flowing through the collar 31 amounts to about one-tenth or less of the quantity of liquid that is carried off by a gas stream which flows through a similar device differing in that no such collar of smaller area is provided. A suitable choice for the ratio of the smallest inside diameter of the collar to the smallest inside diameter of the tubular wall has been found to lie within the limits of 0.8 to 0.95; similarly, the distance between the lower rim of the collar 31 and the upper rim of the wall 25 is advantageously between the limits of 0.1 to 0.4 times the diameter of the rim of the said wall. Accordingly as the inside diameter of the collar is chosen to be smaller, the quantity of liquid carried off by the gas becomes smaller, but the flow resistance in the gas stream increases. The proper choice will, therefore, depend upon the desired operating characteristics of the unit, as determined by the desired conditions under which the contact between liquid and gas is to take place, such as gas velocity, rate of liquid supply and the desired extent of mass transfer.

As a result of the action thus described separation of the liquid from the gas is not begun until after the gas passes the mass-transfer section, save for a small amount of liquid which coalesces on the wall and projection and is immediately re-trained. Because in this construction the vane deck is provided for only one purpose, namely to spin the gas to set up centrifugal separating forces, the said deck can be designed for optimum performance of the separating function, using known expedients. For example, the vanes can be given the contours and inclinations best suited for flinging the liquid outwards. It may, however, be noted that some mass transfer will occur within the vane deck and in the section above the deck.

FIGURE 5 shows a modified construction wherein the liquid is supplied from the liquid supply conduit 16a to an annular trough which includes an annular floor 33 and a vertical wall 34 and is mounted at the supply end of the tubular wall 25. Liquid overflows the rim of the wall 34 and is first swept upwards and then entrained in the gas at the projections 27, 28, as previously described.

FIGURE 6, which is a cross sectional view corresponding to FIGURE 3, shows a modified shape of the tubular wall 25a, which is polygonal in the mass-transfer section below the vane deck. The area in this section is, further, larger than that in the section above the vane deck, for which FIGURE 4 is applicable.

Some results obtained with an apparatus according to the invention will now be mentioned.

A column was formed with four contacting units, each having a cylindrical wall, placed coaxially in series as shown in FIGURE 1. The diameter of each cylinder was 18 cm. Supply of liquid took place via a circumferential slit of 1.5 cm. width, formed in the lateral wall. The vertical distance between corresponding parts of adjacent units was 31 cm. Over a distance of 7.5 cm. immediately beyond each liqud supply slit there was a grid or network of flat strips adjoining the cylinder. The grid consisted of squares with sides of 3.7 cm., the height of each strip perpendicular to the cylinder wall being 1.5 cm. Above each grid of strips there was a vane deck with flat blades, with a blade angle of 30° to the horizontal. The portion of the cylinder beyond the vane deck was 8 cm. long; the diameter of the collar for checking the liquid was 15 cm., the collar protruded from the annular wall by a distance of 1 cm., and the distance between the underside of the collar and the opposite rim of the cylinder was 4 cm.

The arrangement was a vertical one; the liquid flowed back to the preceding contacting apparatus by gravity.

Experiments have been carried out under atmospheric pressure at total reflux with a mixture of equal parts by volume of benzene and toluene and with a similar mixture of n-heptane and toluene. The flow parameter amounted to 0.06; the vapor load factor was varied from 0.3 to 0.7 m./sec.

In these experiments it was found that the quantity of liquid carried along with the gas to the following stage was always less than 1%, calculated on reflux. The pressure drop per meter of column length amounted to 44 cm. of water for the experiments with benzene-toluene, and to 52 cm. of water for n-heptane-toluene, at a vapor load factor of 0.7 m./sec.

The separating efficiency of the column, expressed as the number of theoretical trays per meter of column length amounted for the experiments with benzene-toluene to from 1.2 to 1.5 and for n-heptane-toluene to from 0.9 to 1.3 at vapor load factors from 0.3 to 0.7 m./sec. respectively.

In the foregoing, the flow parameter is defined as $$\frac{q}{Q}\left(\frac{\rho_l}{\rho_g}\right)^{0.5}$$

and the vapor load factor as $$U_o\left(\frac{\rho_g}{\rho_l-\rho_g}\right)^{0.5}$$

wherein $q$ is the quantitative liquid flow,
$Q$ is the quantitative vapor flow,
$U_o$ is the vapor velocity,
$\rho_l$ is the liquid density, and
$\rho_g$ is the vapor density.

We claim as our invention:
1. Apparatus for contacting liquid and gas by concurrent flow which comprises:
   (a) a tubular wall enclosing a contacting chamber having a central vertical axis and providing an open central passage,
   (b) gas inlet means situated centrally with respect to said axis for admitting a stream of gas to one end of said chamber for flow through said passage,
   (c) liquid supply means for supplying liquid into said gas stream within the chamber directly from a point outside said wall at a level near said one end of the chamber for entrainment by said gas stream,
   (d) swirl-imparting means situated within said chamber between and spaced from both said liquid supply means and the other end of said chamber for imparting rotation about said axis to the gas stream and the liquid droplets entrained therein,
   (e) a central gas outlet passageway at the said other end of the chamber,
   (f) liquid discharge means adjacent to said wall situated between said gas outlet passageway and said swirl-imparting means in spaced relation to the latter, and
   (g) projections situated between said liquid supply means and said swirl-imparting means extending from the wall radially inwards toward said central passage but terminating short of said central axis so as to leave said central passage unobstructed for coalescing liquid droplets deposited thereon by said gas, said projections providing edges at their radially inner extremities for retaining coalesced liquid for re-entrainment by the gas stream.

2. Apparatus as defined in claim 1 wherein said projections include a grid of flat strips extending outwardly from the wall.

3. Apparatus as defined in claim 2 wherein said strips extend into the chamber from the said wall through distances between 1 and 20% of the smallest diameter of said tubular wall.

4. Apparatus as defined in claim 1 wherein the said means for supplying liquid includes an annular trough mounted within the chamber in said wall, and means for supplying liquid to said trough.

5. Apparatus for effecting counter-current contacting of gas and liquid comprising:
   (a) a plurality of vertically superposed contacting units, each constructed as defined in claim 1, said one end of each chamber being at the bottom, whereby the gas stream flows upwards through each unit, the gas inlet means of each unit except the lowermost being connected to receive gas from the gas outlet passageway of the next lower unit, and
   (b) conduit means for transferring liquid from the liquid discharge means of each unit except the lowermost to the liquid suply means of the next lower unit.

6. Apparatus as defined in claim 1 wherein said one end of the chamber is the lower end thereof, whereby the gas and entrained liquid flow upwards through the chamber past said projections.

7. The method of contacting a liquid and a gas by concurrent flow which comprises the steps of:
   (a) flowing a stream of said gas upwards along an open linear path through a confined contacting zone,
   (b) supplying liquid from outside said zone directly to said gas stream at a lower part of said zone and entraining the liquid in the gas stream as small droplets,
   (c) within said contacting zone depositing said droplets on surfaces situated laterally of said path, coalescing said deposited droplets on said surfaces, and reentraining the coalesced liquid in said gas stream from said surfaces, (d) above said contacting zone imparting to said gas stream and the liquid droplets entrained therein a rotating motion about the vertical axis of said path and thereby inertially flinging the liquid droplets outwards, (e) flowing said rotating stream through a confined separating zone, coalescing the liquid droplets at the periphery of said zone, and (f) separately discharging the coalesced liquid from the periphery of said separating zone and the gas from the central region of said separating zone.

References Cited by the Examiner

UNITED STATES PATENTS

| | | | |
|---|---|---|---|
| 1,094,107 | 4/1914 | Wickersham | 55—248 |
| 1,121,868 | 12/1914 | Riotte et al. | |
| 1,123,232 | 1/1915 | Brassert et al. | 55—248 |
| 1,362,025 | 12/1920 | Macaulay | 55—448 |
| 1,511,749 | 10/1924 | Powell | 261—118 |
| 2,808,897 | 10/1957 | Reinsch et al. | 55—238 |
| 2,864,463 | 12/1958 | Campbell | 55—419 |
| 2,890,870 | 6/1959 | Spiselman. | |
| 2,970,671 | 2/1961 | Warner | 55—238 X |

FOREIGN PATENTS

| | | |
|---|---|---|
| 630,823 | 10/1949 | Great Britain. |
| 902,223 | 8/1962 | Great Britain. |

ROBERT B. BURNETT, *Primary Examiner.*

HARRY B. THORNTON, *Examiner.*